Dec. 18, 1934.  M. F. BATES  1,984,859

GYRO BASELINE

Filed Aug. 21, 1929

INVENTOR
MORTIMER F. BATES.
BY
Herbert H. Thompson
his ATTORNEY.

Patented Dec. 18, 1934

1,984,859

UNITED STATES PATENT OFFICE 1,984,859

GYRO BASELINE

Mortimer F. Bates, Brooklyn, N. Y., assignor to Sperry Gyroscope Company, Inc., Brooklyn, N. Y., a corporation of New York Application August 21, 1929, Serial No. 387,395

10 Claims. (Cl. 74—5)

This invention relates to gyroscopically maintained baselines, such as a gyro vertical. It is the principal object of this invention to provide such a baseline-maintaining means which shall be more stable than an ordinary pendulum and less subject to errors than a pendulous gyroscope. The ordinary pendulum is unsteady and responds to every slight force tending to displace it from the vertical, while a pendulous gyroscope is subject to errors due to acceleration forces which set up precessional movements. By my invention I cause an ordinary pendulum to act upon a non-pendulous gyroscope through a means, such as an air impressor system, whereby a lag is introduced in the response of the gyro to the movements of the pendulum. Thus there is obtained an averaging device which will absorb or nullify short-period variations in position of the pendulum. The gyroscope itself is non-pendulous and, therefore, not subject to acceleration forces, while the error introduced by acceleration forces acting on the pendulum is cut down due to the lag of the gyro in response to movements of the pendulum. In other words it is only coupled to gravity through a loose coupling which applies an erecting torque on the gyroscope in the proper direction to cause the gyroscope to precess directly to its new position of equilibrium without setting up serious precessional oscillations.

A further object of my invention is the provision of means of the type described for maintaining a baseline which shall be simpler in its structure than similar devices heretofore produced, the gyroscope being in the form of a top with but a single bearing near its center of gravity which provides freedom of spin about a normally vertical axis and freedom for oscillation about both horizontal axes passing through the pivot.

A further object of my invention is the provision of an air driven gyroscope in the above mentioned means for maintaining a reference plane.

Further objects and advantages of this invention will become apparent in the following detailed description thereof:

In the accompanying drawing.

Figure 1:
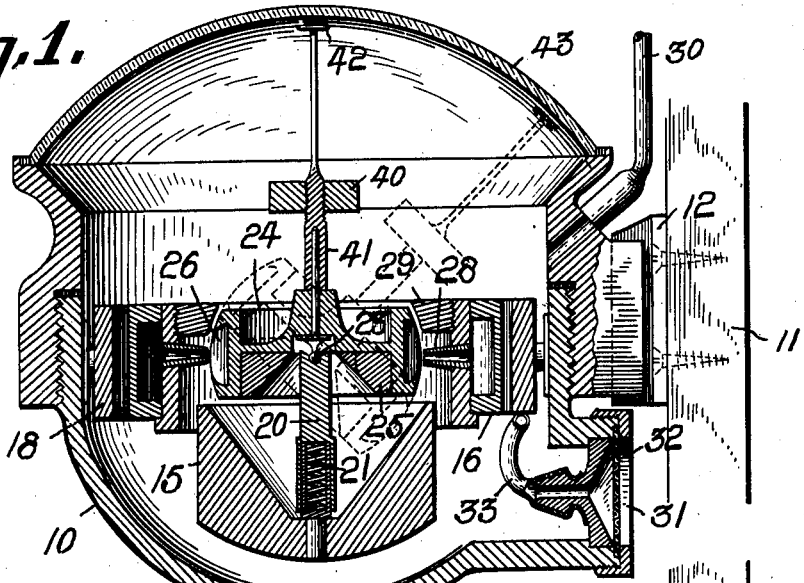
Fig. 1 is a vertical section through a means for indicating the vertical, said means embodying one form of my invention.
Figure 2:
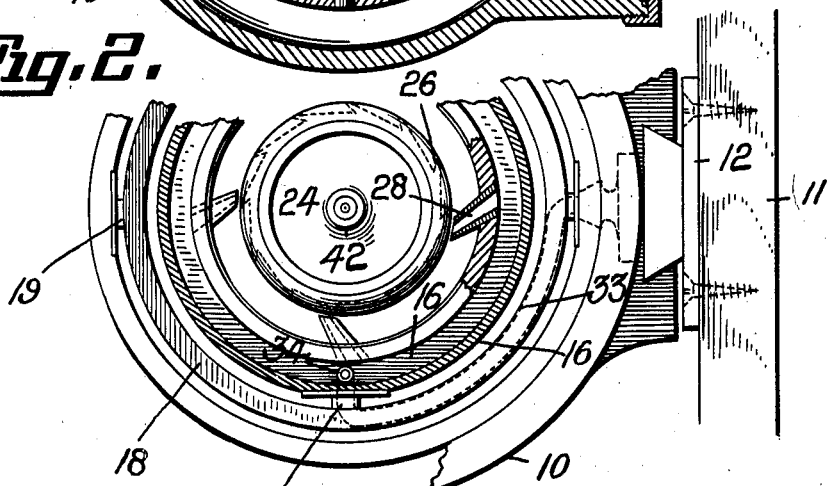
Fig. 2 is a horizontal section taken through the Fig. 1 device substantially on a line immediately above the gyro rotor.

Referring to Figs. 1 and 2 of the drawing, it will be observed that I have shown a two-part casing 10 fastened to a member 11 which may be a portion of a movable craft or other movable member. The said casing may be fixed to the member 11 by means such as bracket 12. Within said casing I mount a pendulum 15 formed integrally with a nozzle ring 16, the said ring being pivotally mounted by pivots 17 in a ring 18, which is in turn pivotally mounted at 19 for movement about an axis at right angles to the axis of mounting 17. The said pivot 19 may be journaled in the casing 10. The pendulum is thus supported for universal movement. The pendulum 15 may be provided with a stem 20 extending upwardly therefrom and supported upon spring member 21. The said stem 20 may be provided in its upper end with a seat for a bearing 23 carried by a gyro rotor, which, in this instance, together with its universal bearing support 23, forms the gyroscope. The gyro rotor 24 is prevented from becoming disengaged with its seat if capsized by means of ring 29. The weight of rotor 24 compresses the spring member 21 until it shoulders.

The said rotor 24 is provided around its periphery with a plurality of buckets 26 against which air is adapted to be directed by a plurality of nozzles 28 carried by the nozzle ring 16. Air is caused to pass through nozzles 28 at high velocity. If the instrument is mounted upon an aircraft, the usual Venturi tube may be employed for accomplishing this purpose, air being sucked out of the casing by means of tube 30 and supplied through an opening 31 through which the air enters. After being filtered by a filter 32 the air is carried by means of tube 33 around ring 18 to pivots 17 whence said tube 33 enters the nozzle ring 16 at point 34. From nozzle ring 16 the air passes through the jets 28 into engagement with the buckets 26 to drive the gyro rotor at relatively high speed.

Figure 3:
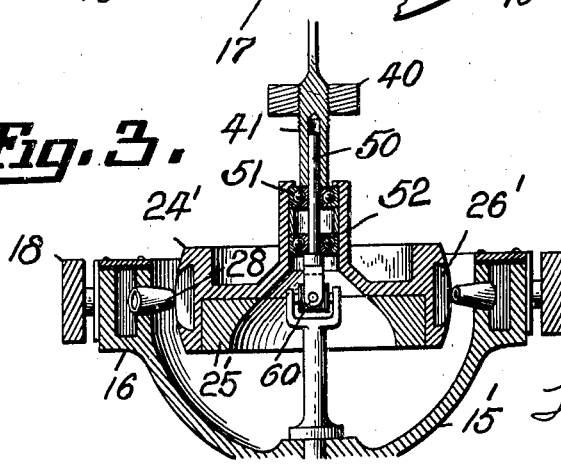
Fig. 3 is a vertical section through a modified form of instrument embodying the principles of my invention, the said view being similar to that of Fig. 1 except that the casing is not shown.

The gyro rotor is universally mounted on a close-fitting ball and socket bearing 23, thus constituting a form of gyroscope resembling a top. The form and fit of this ball and socket bearing is important. It is in no sense a conical rounded pivot riding in a shallow cup as has been heretofore used. The gyroscope is in neutral equilibrium so that it will maintain the position in which it is placed. For setting the gyroscope in said neutral equilibrium, it is necessary that the rotor be made up of two metals of widely different specific gravities as shown at 24 and 25, the inner ring section 25 being of high specific gravity such as brass and the outer rim section 24 of aluminum, and similar construction in Fig. 3 at 24' and 25'. There may also be provided an adjustable weight 40 screw-threaded on a stem 41, which stem may extend upwardly and carry an index 42 which may be seen through the glass cover 43 of the casing 10. Said cover 43 may be provided with suitable markings in the well known manner to indicate degrees of deviation from the vertical.

The plane of the nozzle jets 28 extends through the point of support 23 so that when the stem 41 is vertical no couple is applied by the air jets on the gyro which would tend to cause precession. If, however, the pendulum 15 moves out of the vertical it will carry the jets 28 therewith, since the nozzle ring 16 moves integrally with said pendulum 15, and a couple will then be applied on the gyroscope by the air jets to tend to cause the plane of the gyroscope to line up with the plane of the air jets by the shortest path and without setting up precessional oscillations. This will cause stem 41 to move out of the vertical. A considerable lag, however, takes place between the time that the jets 28 apply a torque to the gyro rotor and the time when the gyro rotor responds thereto to move into the plane of the jets and to move the stem 41 out of the vertical. It will thus be observed that short period oscillations of pendulum 15 will have practically no effect upon the baseline maintained by the gyroscope, since owing to the said time lag such short period oscillations will cancel each other before they exert any definite influence on the gyroscope.

If, however, a persistent acceleration force acts upon the pendulum 15 to throw the same out of vertical for a substantial period of time, then the air issuing from nozzles 28 will exert a torque upon the gyro rotor such as to tend to move the rotor back into the plane of said jets and hence the stem 41 will move out of the vertical to give a temporarily incorrect indication of the desired baseline. This error, however, will owing to the time lag of the action of the pendulum on the gyro rotor, be of much shorter duration than the period during which the pendulum 15 is maintained out of vertical.

It will thus be seen that by the provision of an ordinary pendulum acting through an impressor system on a neutral gyroscope, I obtain an indication of a baseline which is in effect a greatly damped indication as compared with that of the pendulum itself.

In a modification of the above described instrument I may utilize the same principles with a somewhat modified structure. In this form the stem 41 does not rotate continuously with the gyro rotor as in the Figs 1 and 2 form, but remains relatively fixed, being mounted upon a stem 50 which carries guide bearings 51 and 52 for guiding the rotation of the rotor 24'. Thus the rotor 24' rotates around bearings 51—52 and the movements of its plane of rotation are transmitted to stem 41 through the said stem 50 carrying the bearings 51 and 52, the said stem 50 being universally mounted as by means of universal joint 60 on the pendulum member 15'. In all other respects, however, this form of the invention operates similarly to the Figs. 1 and 2 form.

With this construction other forms of indicator pointers may be activated by the stem 41.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In combination, a universally mounted pendulum, a gyroscope supported in neutral equilibrium, an air impressor system for rotating said gyroscope, and means whereby said pendulum controls the application of said air impressor system to said gyroscope.

2. In combination, a universally mounted pendulum, a gyroscope supported thereby in neutral equilibrium, an air impressor system for rotating said gyroscope, and means whereby said pendulum controls the application of said air impressor system to said gyroscope.

3. In combination, a universally mounted pendulum, a gyroscope universally supported thereby in neutral equilibrium, an air impressor system for rotating said gyroscope, and means whereby said pendulum controls the application of said air impressor system to said gyroscope.

4. In combination, a universally mounted pendulum, an air driven gyroscope universally supported thereby in neutral equilibrium, the rotor thereof having blades in the periphery thereof, and an air impressor system carried by said pendulum and adapted to operate in a plane for spinning said rotor and governing the plane of spin thereof, said system including a nozzle ring fixed to said pendulum and having a plurality of nozzles adjacent the blades of said rotor, and means for causing air to enter said ring and issue from said nozzles.

5. In combination, a universally mounted pendulum, an air driven gyroscope universally supported thereby in neutral equilibrium, the rotor thereof having blades in the periphery thereof, and an air impressor system carried by said pendulum and adapted to operate in a horizontal plane when said pendulum hangs vertically for spinning said rotor and maintaining the plane of spin horizontal, said system including a nozzle ring fixed to said pendulum and having a plurality of nozzles adjacent the blades of said rotor, and means for causing air to enter said ring and issue from said nozzles.

6. In combination, a universally mounted pendulum, a gyroscope universally supported thereby in neutral equilibrium, and an air impressor system carried by said pendulum and adapted to operate in a horizontal plane when said pendulum hangs vertically for rotating said gyroscope whereby said pendulum controls the position of said plane, said system including a nozzle ring fixed to said pendulum, a casing enclosing said pendulum and said gyroscope, means for causing air to enter and leave said casing, and means for causing the air within said casing to enter said ring and issue from said nozzles.

7. In a gyro vertical, a gyroscope universally mounted in neutral equilibrium and including a gyro rotor, means for applying a spinning torque to the periphery of the gyro rotor in a normally horizontal plane for rotating the same around a normally vertical spinning axis, and a universally mounted pendulous support for said spinning means whereby the gyroscope is controlled through the spinning means, said rotor and spinning means being free to oscillate independently except for the self-aligning action of the spinning torque.

8. In a gyro vertical, a universally mounted pendulum, a gyroscope universally supported thereby in neutral equilibrium and including a gyro rotor, means for exerting a spinning torque to the periphery of the gyro rotor in a normally horizontal plane for rotating said gyroscope, and means whereby said pendulum controls the plane of said spinning means, said rotor and spinning means being free to oscillate independently except for the self-aligning action of the spinning torque.

9. In a gyroscopic artificial horizon, a gyroscopic rotor, means for universally supporting the same in neutral equilibrium with a normally vertical spinning axis, spinning means for the rotor adapted to exert a spinning, self-aligning torque to the periphery thereof, and pendulous means for maintaining the horizontality of said spinning means, said first-named means and spinning means being free to oscillate independently except for the self aligning action of the spinning torque.

10. In an artificial horizon having a gyroscope, a gyroscopic rotor, means for universally supporting the same in neutral equilibrium with a normally vertical spinning axis, spinning means for the rotor having a self-aligning, non-contacting driving connection therewith, and pendulous means for controlling the position of said spinning means.

MORTIMER F. BATES.